No. 647,672. Patented Apr. 17, 1900.
W. D. FORSYTH & E. T. BELL.
DEVICE FOR REMOVING SCALE FROM BOILER TUBES.
(Application filed Sept. 18, 1899.)
(No Model.) 2 Sheets—Sheet 1.
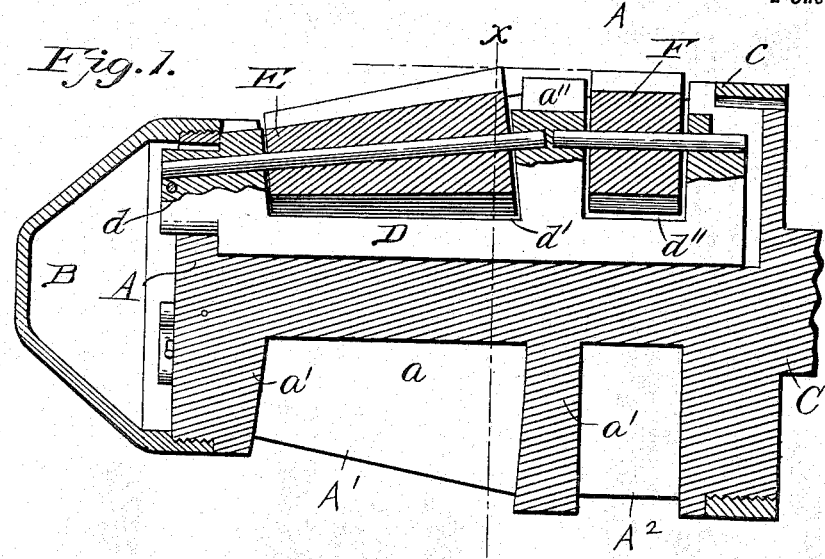
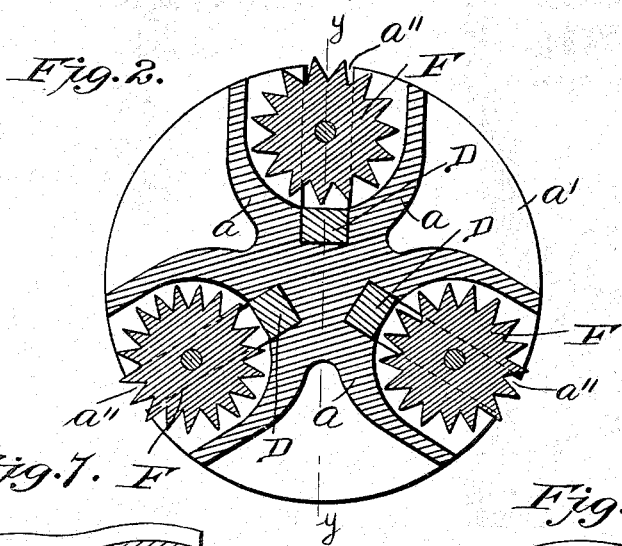
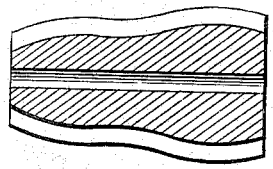
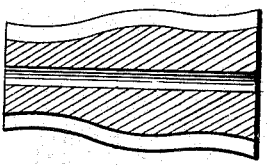
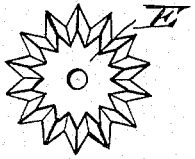
WITNESSES:
E. G. McKee
G. M. Anderson
INVENTORS
Wilber D. Forsyth
Enos T. Bell
BY
E. W. Anderson
their ATTORNEY.

No. 647,672. Patented Apr. 17, 1900.
W. D. FORSYTH & E. T. BELL.
DEVICE FOR REMOVING SCALE FROM BOILER TUBES.
(Application filed Sept. 18, 1899.)
(No Model.) 2 Sheets—Sheet 2.
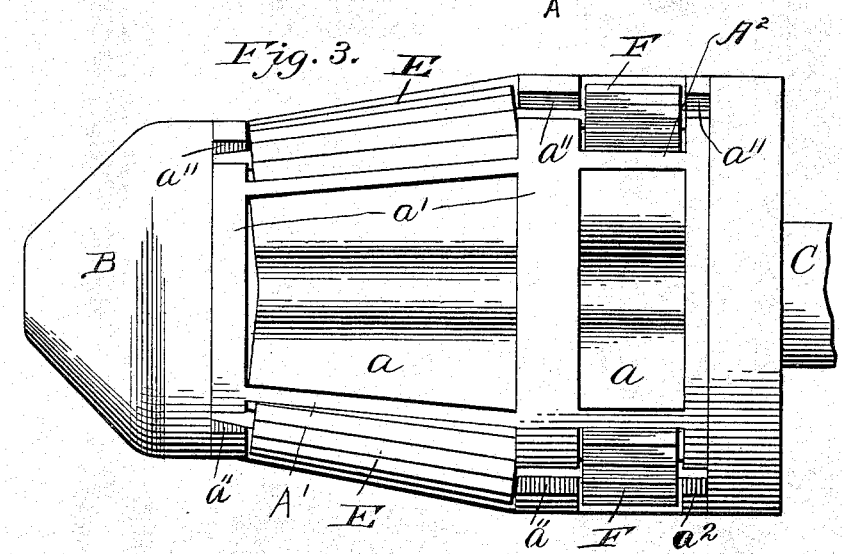
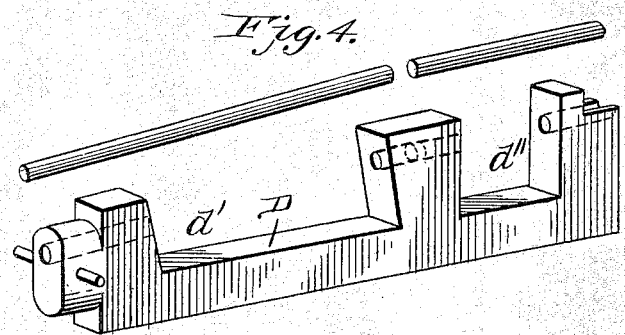
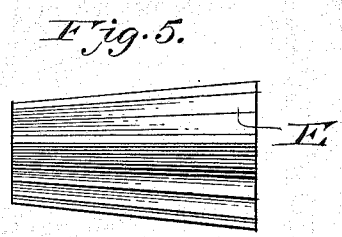
WITNESSES:
E. J. McKee.
G. M. Anderson
INVENTORS
Wilber D. Forsyth,
Enos T. Bell.
BY
E. W. Anderson
their ATTORNEY.

UNITED STATES PATENT OFFICE.

WILBER D. FORSYTH AND ENOS T. BELL, OF PITTSBURG, PENNSYLVANIA.

DEVICE FOR REMOVING SCALE FROM BOILER-TUBES.

SPECIFICATION forming part of Letters Patent No. 647,672, dated April 17, 1900.

Application filed September 18, 1899. Serial No. 730,854. (No model.)

*To all whom it may concern:*

Be it known that we, WILBER D. FORSYTH and ENOS T. BELL, citizens of the United States, and residents of Pittsburg, in the county of Allegheny and State of Pennsylvania, have invented certain new and useful Improvements in Devices for Removing Scale from Boiler-Tubes; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a section on the line $y\ y$, Fig. 2. Fig. 2 is a section on the line $x\ x$, Fig. 1. Fig. 3 is a side elevation of the invention. Fig. 4 is a detail view of one of the cutter-carrying arms and its cutter-journals. Figs. 5, 6, 7, and 8 are detail views of different forms of cutters.

This invention has relation to devices for removing scale from boiler-tubes and other tubular structures; and it consists in the novel construction and arrangement of parts, all as hereinafter set forth.

In the accompanying drawings, illustrating this invention, the letter A designates the body portion of the cleaner head, which consists of a forward conical portion $A'$, comprising web-form or radial ribs $a$, connected at front and rear by radially-slotted circular ledges $a'$, and of a rear cylindrical portion $A^2$, consisting also of radial ribs $a$, connected at the rear by a radially-slotted circular ledge $a'$ and connected forwardly by the rear circular ledge of said forward coniform portion. The above circular and radial ledges are adapted to be all cast in one piece.

B represents the conoidal point portion of the head, and C the base portion, to which power is applied in order to rotate the cleaner.

D D indicate arms which are pivoted at $d$ in the radial slots of the forwardmost ledge $a'$ in such manner as to have under rapid rotation an outward radial movement, being guided in such movement by the radial slots $a''$ of the ledges $a'$, and being limited in such movement by stops, (indicated at $c$). The side walls of the radial slots of the intermediate and rearmost circular ledges $a'$ support said arms D in all positions thereof against lateral strain. Each arm D is provided with a seat $d'$ for the reception of an elongated pivoted rolling cutter or cleaner E, working in the radial recesses between the forward radial ledges $a'$, and usually of tapering or cone-frustum form, and with a seat $d''$ for the reception of a cylindrical finishing-roller or rotating cleaner F, working in the radial recesses between the rear radial ledges $a'$, and which, following the main cleaning-roller E, serves to clean the bore of the tube and give it a smooth finish. It is not designed, therefore, that the outer teeth of the finishing-rolls shall project beyond the outer teeth of the cutting or cleaning rolls at their broader ends or bases, as they are not intended to work in a circular path of larger diameter than that of the forward tapering roll-cleaners.

There are provided in each head three or more of the movable arms D, carrying rolling cutters, and it is preferred that the rolling cutters E each extend substantially the entire length of the conical portion of the body and be made with teeth extending lengthwise thereof or rib-teeth and that with the same diameter each rolling cutter have a different number of teeth, in order to facilitate their attack upon the scale and to avoid "tracking" in their work.

The cleaner-head having been inserted in the tube is rapidly rotated by any suitable power, and this rotation causes the arms and their rolling cleaners to move outward and attack the scale by rolling contact under centrifugal pressure. The rib-teeth of the forward cleaner-rolls rapidly cut into and disintegrate the scale, the differentiation in their action facilitating the matter. Furthermore the cleaner-cutters having inclined action against the scale throughout their length and working from a lesser to a higher angle gradually cut out the scale in a conical manner and without forming steps or obstructive ledges in the work. The teeth of these cutters when at the outer limit of their movement extend substantially the entire thickness of the scale incrustation. The cleaner-rolls are followed by the cylindrical rolls which work upon the inside of the tube in a manner parallel there-with and have a finishing or polishing effect thereon, cleaning away the traces of the rough work of the forward cutters.

In this head it will be observed that the cleaner-cutters are elongated and each one extends the entire length of the cleaning portion of the head, being followed only by the finishing-roller.

In its construction the cleaner-head is compact and durable and is believed to be well adapted to the hard work for which it is designed.

Having described this invention, what we claim, and desire to secure by Letters Patent, is—

1. In a tube-cleaner, a rotatory head, centrifugally-acting arms mounted in said head, each of said arms having journaled on it a single elongated inclined rolling cutter having an uninterrupted inclined cutting-face adapted to make an inclined cut in the scale.

2. In a tube-cleaner, a rotatory head, centrifugally-acting arms mounted in said head, each of said arms having journaled on it a single elongated inclined rolling cutter having an uninterrupted inclined cutting-face adapted to make an inclined cut in the scale, and finishing-cutters following said first-named cutters.

3. In a tube-cleaner, a rotatory head, centrifugally-acting arms mounted in said head, each of said arms having journaled on it a single frusto-conical cutter having an uninterrupted cutting-face adapted to make an inclined cut in the scale.

4. In a tube-cleaner, a rotatory head, centrifugally-acting arms mounted in said head, each of said arms having journaled on it a single frusto-conical cutter having an uninterrupted cutting-face adapted to make an inclined cut in the scale, and finishing rolling cutters following said first-named cutters.

5. In a tube-cleaner, a rotatory head, centrifugally-acting arms mounted in said head, each of said arms having journaled on it a single frusto-conical cutter having an uninterrupted cutting-face and finishing rolling cutters following said first-named cutters having working faces which when thrown outwardly will be parallel with the walls of the tube.

6. In a tube-cleaner, a rotatory head, centrifugally-acting arms mounted in said head, each of said arms having journaled on it a single elongated inclined rolling cutter having an uninterrupted inclined cutting-face, said cutters having differentiated longitudinal teeth.

7. The combination with a cleaner-head adapted to be cast in one piece, and consisting of a coniform forward portion having web form or radial ribs connected at the front by a circular ledge, and connected at the rear by a radially-slotted circular ledge, and of a rear portion having radial ribs connected at the rear by a radially-slotted circular ledge, and connected forwardly by the rear ledge of said forward coniform portion, of centrifugally-acting cutter-carrying arms pivoted to said forward circular ledge, and working in the radial slots of said rear circular ledges, and rolling cutters carried by said arms, and working in radial recesses between said radial ledges, substantially as specified.

8. A cleaner-head for removing scale from boiler-tubes consisting of a coniform body having a web-form central portion, radially-slotted circular ledges, swinging arms pivoted at the forward ledge, the long inclined cutting-rollers and the following finishing-rollers, connected to said arms, and the point and base connected to the front and rear ends of said body, substantially as specified.

In testimony whereof we affix our signatures in presence of two witnesses.

WILBER D. FORSYTH.
ENOS T. BELL.

Witnesses:
A. FRASER LEGGATE,
THOMAS LEGGATE.